UNITED STATES PATENT OFFICE.

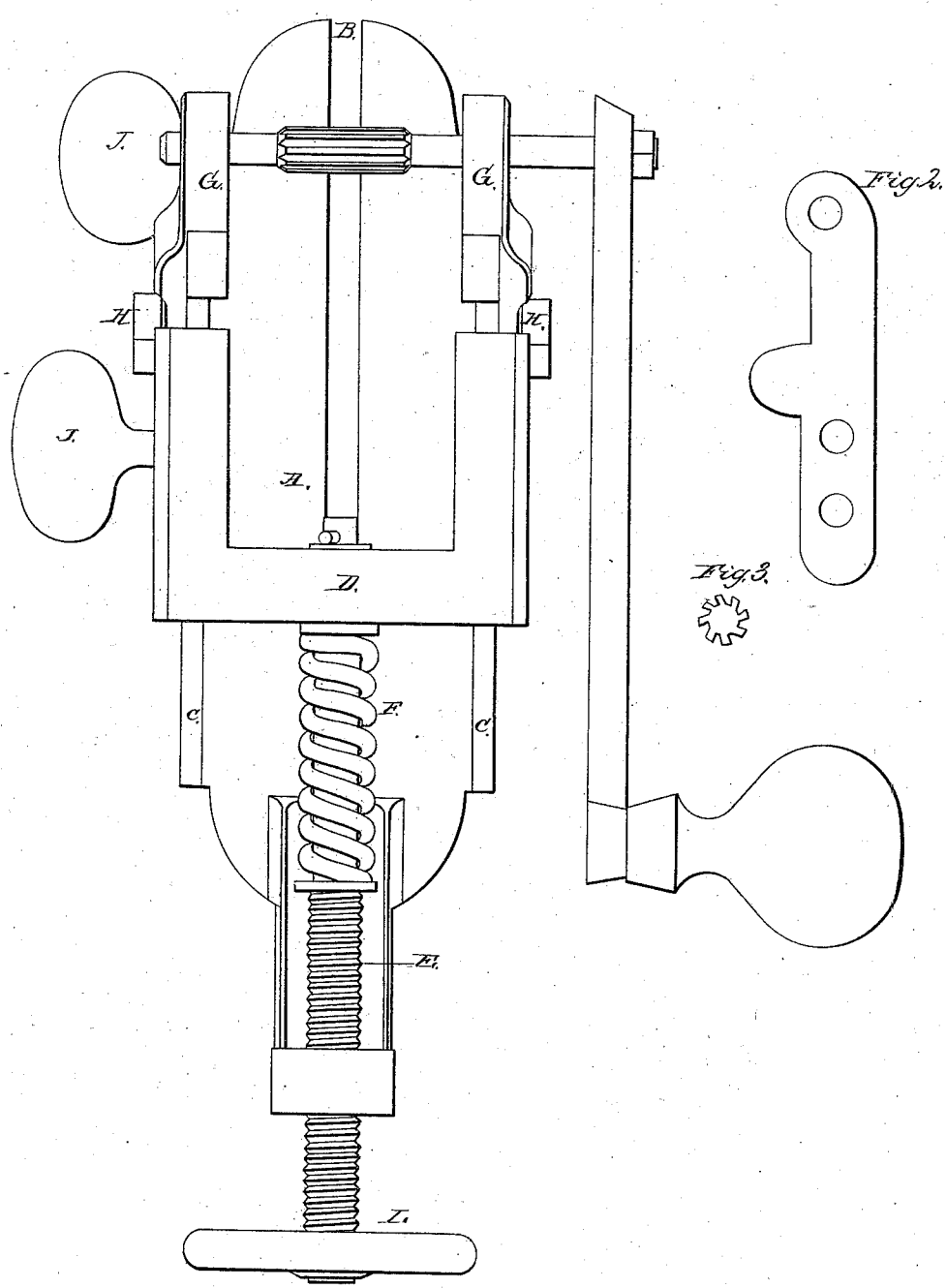

OLIVER B. JUDD, OF LITTLE FALLS, NEW YORK.

SAW-GUMMER.

Specification of Letters Patent No. 17,153, dated April 28, 1857.

*To all whom it may concern:*

Be it known that I, OLIVER B. JUDD, of Little Falls, in the county of Herkimer and State of New York, have invented a new and useful Improvement in Saw-Gummers; and I do hereby declare that the following is a full and exact description thereof, reference being had to the accompanying drawings and to the letters of reference marked thereon.

Figure 1 is a top view of the gummer. Fig. 2 is a side view of one of the posts shown in the drawing marked G. Fig. 3 is the end view of the cutter shown in the drawing marked I.

Letter A is the body, B the slot.

C C are the tongues or ways.

D is the cap used for cutting straight.

E is the spindle.

F is the spiral spring.

G G are two posts used for cutting circles.

H H are two set screws.

I is the cutter or bur.

J J are two thumb screws to hold the saw and K is the crank.

The nature of my improvement consists in making the machine in such a manner as the teeth of saws can be dressed or gummed and be cut from the point straight or on a circle, as is wanted for circular saws in most cases.

To enable others skilled in the art to make and use my invention I will proceed to describe its construction and operation.

Letter A is the body of the machine, nine inches long, three inches wide, two inches thick.

B is a slot running from the forward end of the machine back within two inches of the back end, of sufficient width to receive the saw when gummed.

C, C, are two tongues projecting one on each side of said body A.

The cap D is made of three pieces three inches long. The two side pieces of the cap D are made enough wider than the back piece to make a groove in the inside of each of sufficient width to fit on the tongues C, C. In the back part of the cap D is a hole to receive the small end of the spindle E. Said spindle is eight inches long, on which I place a spiral spring F. On the remaining part of the spindle back of the spring I form a screw which passes through a piece projecting out from the body A two inches back. This spindle being screwed into its place and the small end passing through and made fast to the cap D when turned moves the cap on its ways back and forth as desired.

G, G, are two posts fastened to the body A forward and below the cap D, with two set screws H H. On the upper end of the posts above the cap I make two or more holes in each post to receive the cutter I. I also make holes in the forward end of the cap D to receive the same cutter that is now shown in the posts. When used in the cap D it is to cut on a straight line, but when used in the posts, where it is shown in the annexed drawings, it is for cutting the teeth of circular saws on a circle. By using the screw and spring the cap D is forced against the posts G G and the cutter I moves on a circle from the point of the tooth to the roots. I fasten the saw in the slot B at any angle required with two thumb screws J J. When the machine is used for cutting the top of the teeth I change ends with the cutter. This brings the crank on the opposite side of the machine from where it is now shown. I move the thumb screws also on the opposite side of the machine from where they are now shown out of the way of the crank. The position of the machine as now shown in the drawing is after cutting on the under side of the tooth and by shifting the cutter I in other holes in the posts G G I cut any circle required to suit the different sized saws.

Fig. 3 is an end view of the cutter shown in the drawings marked I, which I make of steel of sufficient size and length to suit the sized machine used. In making the cutter I form the teeth of the cutter of an equal thickness down to the shaft so that the teeth harden alike and be of an equal temper until worn out. The way that burs have been made is to make the teeth thick at the shaft and running to an edge at the top. In this case the bur becomes soft and worthless before it is half worn; but when made as above described and as shown in the drawing at Fig. 3 it will hold a good cutting edge until entirely worn down and do twice the amount of work as when made the usual way. I sharpen the bur by grinding.

I do not claim dressing saw teeth on a circle as I am aware this has been done imperfectly by means of complicated machines, but

I claim—

The method of constructing and arranging the posts G, G, so as to cause the cutter to move in regular curves as described.

OLIVER B. JUDD. [L. S.]

Signed and sealed in the presence of us:
DOUGLASS MOORE,
B. SEVERSON.